H. K. NORTON.
MOTION PICTURE CAMERA.
APPLICATION FILED JUNE 27, 1916.
1,267,688.
Patented May 28, 1918.
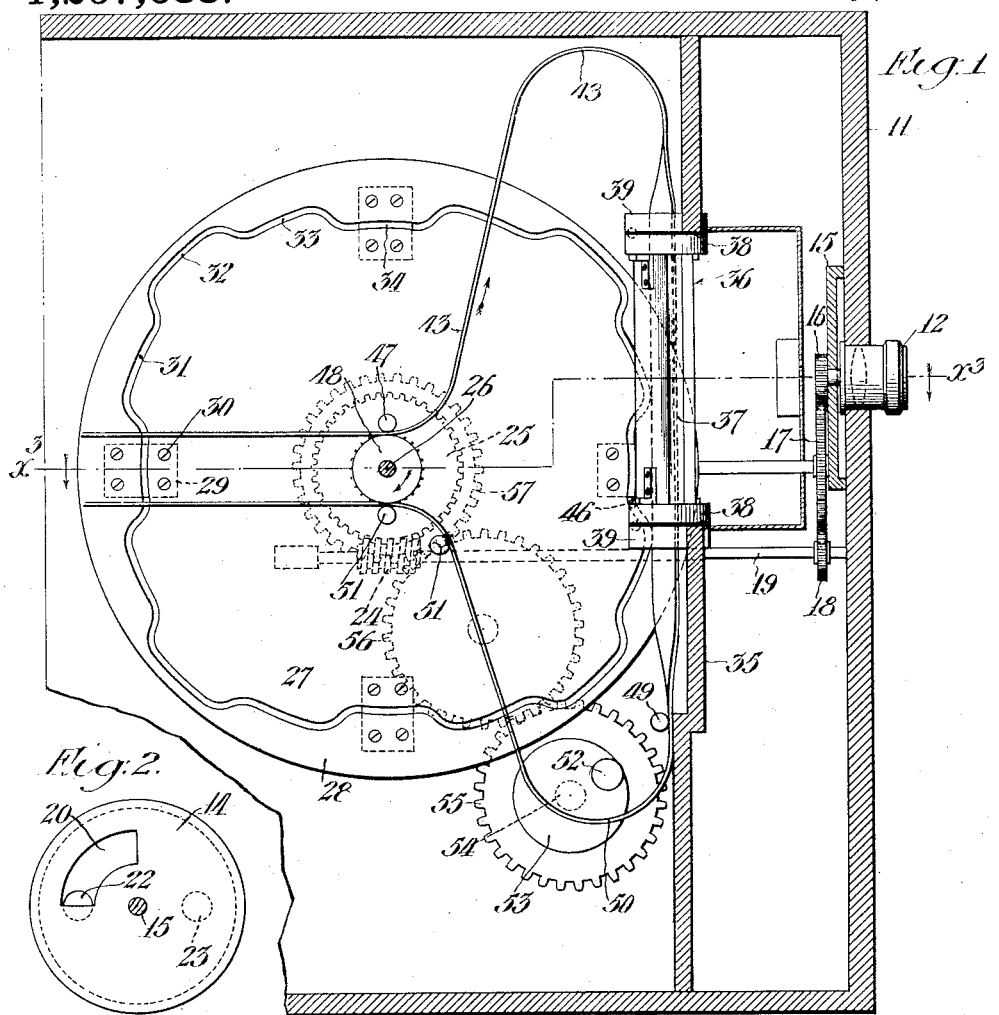
Fig. 1.
Fig. 2.
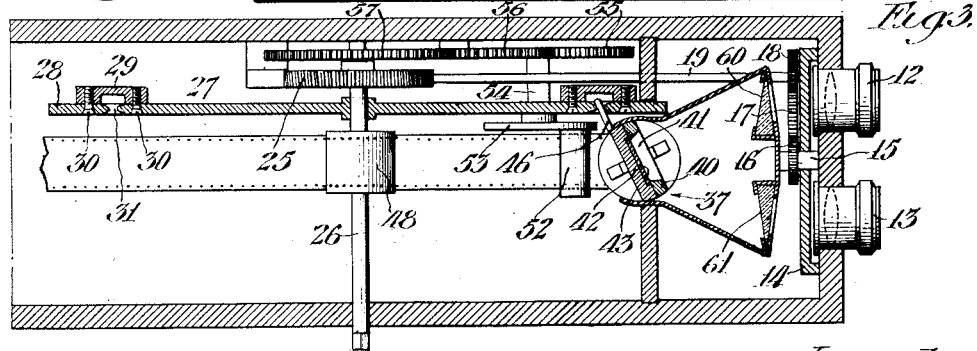
Fig. 3.
Inventor
Henry K. Norton
by Graham & Davis
his Attorneys ved to it a gear 16. The
UNITED STATES PATENT OFFICE.

HENRY K. NORTON, OF LOS ANGELES, CALIFORNIA.

MOTION-PICTURE CAMERA.

1,267,688.  Specification of Letters Patent.  Patented May 28, 1918.

Application filed June 27, 1916. Serial No. 106,256.

*To all whom it may concern:*

Be it known that I, HENRY K. NORTON, a citizen of the United States, residing at Los Angeles, in the county of Los Angeles and State of California, have invented a new and useful Motion-Picture Camera, of which the following is a specification.

My invention relates to the motion picture art, and the principal object of the invention is to provide a camera by which photographs can be taken on a standard motion picture film in such a manner that the image of the photograph will produce a stereoscopic effect when projected on a standard screen by means of a standard projector. To produce this effect alternate right and left hand exposures of the film are made, the right hand exposure showing the objects photographed in the same position that they assume on the retina of the right eye of an observer, and the left hand picture showing the same objects as they would appear when impressed on the left eye of an observer.

Further objects and advantages will be set forth hereinafter.

Referring to the drawings, which are for illustrative purposes only:

Figure 1 is a sectional elevation through the center of a camera embodying my invention.

Fig. 2 is a front elevation of a shutter.

Fig. 3 is a section on the line $x^3$—$x^3$ of Fig. 1, this view being viewed in the direction of the arrows.

The invention in the form illustrated, consists of a light tight box 11 in the front of which is rigidly secured a pair of duplicate lens systems 12 and 13, these lens systems being separated by a distance aproximately equal to the distance between the centers of a pair of adult human eyes, and having their centers approximately on the same horizontal line. Located behind the lenses 12 and 13 inside the box 11 is a shutter 14, this shutter turning freely on a shaft 15 and having secured to it a gear 16. The gear 16 is driven through an idler gear 17 and a driving pinion 18 from a shaft 19. The shutter is provided with a single aperture 20, this aperture being so placed that it passes behind openings 22 and 23 of the lens systems 12 and 13 as the shutter is rotated. The shaft 19 is provided with a spiral gear 24 which is driven from a second spiral gear 25 carried on a shaft 26. The shaft 26 is driven by a crank, not shown, or by any other suitable means. Secured on the shaft 26 is a cam plate 27, this cam plate having secured to it a cam rim 28 by means of blocks 29 and screws 30, the cam plate and the cam rim 28 being so located with respect to each other that a cam groove 31 is formed between them, this cam groove 31 consisting of right hand portions 32, central portions 33, and left hand portions 34, these parts being repeated around the periphery of the cam plate as shown in Fig. 1.

A partition 35 is provided having an opening 36 in which is mounted a swinging carrier 37, this carrier being provided with flanges 38 in the top and bottom thereof, which turn on ball bearings between blocks 39 secured to the partition 35. A member 40 having an opening 41 therethrough, and a backing member 42 having a groove therein in which a film 43 can slide are secured between the flanges 38. The flanges 38 and the blocks 39 have openings through which the film 43 may pass. A pin 46 projects out from the carrier 37, into the groove 31 as shown in Fig. 3. The film 43, from a reel not shown, passes between a roller 47 and a sprocket 48 carried centrally on the shaft 26, passing in an upward loop 48 to the top of the carrier 37 and downwardly through this carrier and under a roller 49, forming a lower loop 50, and passing upwardly between rollers 51 and the sprocket 48, and from thence to a reel not shown. A beater pin 52 is placed eccentrically on a disk 53 which is rotated by a shaft 54, the shaft 54 being driven through gears 55, 56 and 57 from the shaft 26.

The lens systems 12 and 13 are rigidly secured in front of the box 11, and accurately focused on the same portion of space, so that they will include the same objects in their field of view, these objects, however, being viewed from slightly different angles so that these images will correspond to a right eye image and a left eye image. For the purpose of directing these images on the film 43, prisms 60 and 61 are provided, these prisms being of such a shape that they place the vertical central line of the image exactly on the vertical axis of the carrier 37, and therefore exactly on the vertical central line of the film 43 which is being carried by the carrier 37. The lines of projection from the prisms 60 and 61 to the center of the film, form an acute angle with each other, and the purpose of the carrier 37 is to turn the film 43 into such a position that the projection from first one of the prisms 60, and then from the other, is thrown upon the film in exactly right angles to its surface. Obviously mirrors or other light deflecting means could be substituted for the prisms 60 and 61.

The method of operation of the invention is as follows:—

The camera is focused on the scene which it is desired to reproduce in a motion picture, and the shaft 26 is actuated by any convenient means. This actuation of the shaft feeds the film 43 in the direction of the arrows, the sprocket 48 entering the perforations on the edge of the film, and driving it at an approximately constant rate of speed. The beater pin 52 is caused to travel at such a rate that it engages the loop 50 after each exposure, pulling the film 43 in the carrier 37 downwardly a sufficient distance to provide for the next exposure. This movement of the film takes place during dark periods between exposures. At the same time the carrier 37 is turned by means of the groove 31 so that the exposures are made with the film at right angles to the line of light from the prisms 60 and 61 through which the picture enters. The result is that a right hand picture is taken, the film is moved, and the carrier is turned, and a left hand picture is taken, and the process is repeated. The result is, a film having right and left hand pictures alternately arranged thereon. When this film is thrown on a motion picture screen, first the right hand image and then the left hand image is impressed on the screen, and due to the persistence of vision, these pictures are blended automatically by the eyes of the observer to give a stereoscopic, or distance effect, to the completed picture.

I claim as my invention:—

1. A motion picture camera comprising a light tight box; a photographic film in said box; a pair of lenses set in the front of said box and so arranged that they are focused on the same portion of space, the center of said lenses being separated by a distance approximately equal to the distance between the centers of a pair of adult human eyes; a rotating shutter having a single opening for causing an exposure first through one lens and then through the other with considerable dark intervals between said exposures; mechanism connected to move synchronously with said shutter to advance said film a distance at least equal to one exposure in each of said dark intervals between exposures; a pair of prisms, each prism being arranged to direct the image produced by one of said lenses upon the film in such a manner that the vertical axes of the images from both lenses coincide with the vertical axis of the film, and the horizontal axes fall in a plane to which said vertical axis of said film is perpendicular; a carrier in which said film slides vertically, said carrier being arranged to swing about the vertical axis of the film, a cam driven synchronously with said shutter and engaging said carrier, said cam being so formed that it swings said carrier in each of said dark intervals into a proper position to receive vertically the image from the lens to be next exposed by said shutter.

2. A motion picture camera comprising a light tight box; a photographic film in said box; a pair of lenses set in the front of said box and so arranged that they are focused on the same portion of space, the center of said lenses being separated by a distance approximately equal to the distance between the centers of a pair of adult human eyes; a rotating shutter having a single opening for causing an exposure first through one lens and then through the other lens with considerable dark intervals between said exposures; mechanism connected to move synchronously with said shutter to advance said film a distance at least equal to one exposure in each of said dark intervals between exposures; a pair of light deflecting means, each arranged to direct the image produced by one of said lenses upon the film in such a manner that the vertical axes of the images from both lenses coincide with the vertical axis of the film, and the horizontal axes fall in a plane to which said vertical axis of said film is perpendicular; a carrier in which said film slides vertically, said carrier being arranged to swing about the vertical axis of the film, a cam driven synchronously with said shutter and engaging said carrier, said cam being so formed that it swings said carrier in each of said dark intervals into a proper position to receive vertically the image from the lens to be next exposed by said shutter.

3. A motion picture camera comprising a light tight box; a photographic film in said box; a pair of lenses set in the front of said box and so arranged that they are focused on the same portion of space, the center of said lenses being separated by a distance approximately equal to the distance between the centers of a pair of adult human eyes; means for alternately exposing said lenses with dark intervals between exposures; mechanism connected to move synchronously with said shutter to advance said film a distance at least equal to one exposure in each of said dark intervals between exposures; a pair of prisms, each prism being arranged to direct the image produced by one of said lenses upon the film in such a manner that the vertical axes of the images from both lenses coincide with the vertical axis of the film, and the horizontal axes fall in a plane to which said vertical axis of said film is perpendicular; a carrier in which said film slides vertically, said carrier being arranged to swing about the vertical axis of the film, a cam driven synchronously with said shutter and engaging said carrier, said cam being so formed that it swings said carrier in each of said dark intervals into a proper position to receive vertically the image from the lens to be next exposed by said shutter.

4. A motion picture camera comprising a light tight box; a photographic film in said box; a pair of lenses set in the front of said box and so arranged that they are focused on the same portion of space, the center of said lenses being separated by a distance approximately equal to the distance between the centers of a pair of adult human eyes; means for alternately exposing said lenses with dark intervals between exposures; mechanism connected to move synchronously with said shutter to advance said film a distance at least equal to one exposure in each of said dark intervals between exposures; a pair of light deflecting means, each arranged to direct the image produced by one of said lenses upon the film in such a manner that the vertical axes of the images from both lenses coincide with the vertical axis of the film, and the horizontal axes fall in a plane to which said vertical axis of said film is perpendicular; a carrier in which said film slides vertically, said carrier being arranged to swing about the vertical axis of the film, a cam driven synchronously with said shutter and engaging said carrier, said cam being so formed that it swings said carrier in each of said dark intervals into a proper position to receive vertically the image from the lens to be next exposed by said shutter.

5. A motion picture camera comprising a light tight box; a photographic film in said box; a pair of lenses set in the front of said box and so arranged that they are focused on the same portion of space; a rotating shutter having a single opening for causing an exposure first through one lens and then through the other lens with considerable dark intervals between said exposures; mechanism connected to move synchronously with said shutter to advance said film a distance at least equal to one exposure in each of said dark intervals between exposures; a pair of prisms, each prism being arranged to direct the image produced by one of said lenses upon the film in such a manner that the vertical axes of the images from both lenses coincide with the vertical axis of the film, and the horizontal axes fall in a plane to which said vertical axis of said film is perpendicular; a carrier in which said film slides vertically, said carrier being arranged to swing about the vertical axis of the film, a cam driven synchronously with said shutter and engaging said carrier, said cam being so formed that it swings said carrier in each of said dark intervals into a proper position to receive vertically the image from the lens to be next exposed by said shutter.

6. A motion picture camera comprising a light tight box; a photographic film in said box; a pair of lenses set in the front of said box and so arranged that they are focused on the same portion of space, the center of said lenses being separated by a distance approximately equal to the distance between the centers of a pair of adult human eyes; a rotating shutter having a single opening for causing an exposure first through one lens and then through the other lens with considerable dark intervals between said exposures; mechanism connected to move synchronously with said shutter to advance said film a distance at least equal to one exposure in each of said dark intervals between exposures; a pair of prisms, each prism being arranged to direct the image produced by one of said lenses upon the film in such a manner that the vertical axes of the images from both lenses coincide with the vertical axis of the film, and the horizontal axes fall in a plane to which said vertical axis of said film is perpendicular; a carrier in which said film slides vertically, said carrier being arranged to swing about the vertical axis of the film, and means for twisting the carrier before each exposure in such a manner that the image will be projected perpendicularly to the plane of said film.

7. A motion picture camera comprising a light tight box; a photographic film in said box; a pair of lenses set in the front of said box and so arranged that they are focused on the same portion of space, the center of said lenses being separated by a distance approximately equal to the distance between the centers of a pair of adult human eyes; a rotating shutter having a single opening for causing an exposure first through one lens and then through the other lens with considerable dark intervals between said exposures; mechanism connected to move synchronously with said shutter to advance said film a distance at least equal to one exposure in each of said dark intervals between exposures; a pair of prisms, each prism being arranged to direct the image produced by one of said lenses upon the film in such a manner that the vertical axes of the images from both lenses coincide with the vertical axis of the film, and the horizontal axes fall in a plane to which said vertical axis of said film is perpendicular; and means for twisting said film during each dark interval into a position to vertically receive the image of the succeeding exposure.

8. A motion picture camera comprising a light tight box; a photographic film in said box; a pair of lenses set in the front of said box and so arranged that they are focused on the same portion of space, the center of said lenses being separated by a distance approximately equal to the distance between the centers of a pair of adult human eyes; a rotating shutter having a single opening for causing an exposure first through one lens and then through the other lens with considerable dark intervals between said exposures; mechanism connected to move synchronously with said shutter to advance said film a distance at least equal to one exposure in each of said dark intervals between exposures; a pair of light deflecting means, each arranged to direct the image produced by one of said lenses upon the film in such a manner that the vertical axes of the images from both lenses coincide with the vertical axis of the film, and the horizontal axes fall in a plane to which said vertical axis of said film is perpendicular; and means for twisting said film during each dark interval into a position to vertically receive the image of the succeeding exposure.

9. A motion picture camera comprising a light tight box; a photographic film in said box; a pair of lenses set in the front of said box and so arranged that they are focused on the same portion of space, the center of said lenses being separated by a distance approximately equal to the distance between the centers of a pair of adult human eyes; means for alternately exposing said lenses with dark intervals between exposures; mechanism connected to move synchronously with said shutter to advance said film a distance at least equal to one exposure in each of said dark intervals between exposures; a pair of prisms, each prism being arranged to direct the image produced by one of said lenses upon the film in such a manner that the vertical axes of the images from both lenses coincide with the vertical axis of the film, and the horizontal axes fall in a plane to which said vertical axis of said film is perpendicular; and means for twisting said film during each dark interval into a position to vertically receive the image of the succeeding exposure.

10. A motion picture camera comprising a light tight box; a photographic film in said box; a pair of lenses set in the front of said box and so arranged that they are focused on the same portion of space, the center of said lenses being separated by a distance approximately equal to the distance between the centers of a pair of adult human eyes; means for alternately exposing said lenses with dark intervals between exposures; mechanism connected to move synchronously with said shutter to advance said film a distance at least equal to one exposure in each of said dark intervals between exposures; a pair of light deflecting means, each arranged to direct the image produced by one of said lenses upon the film in such a manner that the vertical axes of the images from both lenses coincide with the vertical axis of the film, and the horizontal axes fall in a plane to which said vertical axis of said film is perpendicular; and means for twisting said film during each dark interval into a position to vertically receive the image of the succeeding exposure.

In testimony whereof, I have hereunto set my hand at Los Angeles, California, this 21st day of June, 1916.

HENRY K. NORTON.